United States Patent
Corbett et al.

(10) Patent No.: US 8,296,320 B1
(45) Date of Patent: Oct. 23, 2012

(54) METHOD AND SYSTEM FOR STORING CLIENTS' ACCESS PERMISSIONS IN A CACHE

(75) Inventors: Peter Corbett, Lexington, MA (US); Saadia Shaheen Khan, Milpitas, CA (US); Vadim Finkelstein, Hayward, CA (US); Mukesh Kacker, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 482 days.

(21) Appl. No.: 11/799,302

(22) Filed: Apr. 30, 2007

(51) Int. Cl.
*G06F 17/30* (2006.01)
(52) U.S. Cl. .................. 707/781; 707/786; 707/787
(58) Field of Classification Search .................. 707/781, 707/786, 787
See application file for complete search history.

(56) References Cited

U.S. PATENT DOCUMENTS

| | | | |
|---|---|---|---|
| 6,453,419 B1* | 9/2002 | Flint et al. | 726/3 |
| 7,516,275 B2* | 4/2009 | DeMent et al. | 711/128 |
| 2001/0034771 A1* | 10/2001 | Hutsch et al. | 709/217 |
| 2005/0027795 A1* | 2/2005 | San Andres et al. | 709/203 |
| 2006/0184821 A1* | 8/2006 | Hitz et al. | 714/6 |

\* cited by examiner

*Primary Examiner* — Baoquoc To
(74) *Attorney, Agent, or Firm* — Blakely, Sokoloff, Taylor & Zafman LLP

(57) ABSTRACT

A storage server maintains a number of datasets (e.g., exported file systems or other resources). For each dataset, certain clients are allowed to have access (e.g., read access, write access, root access, etc.) and certain other clients are not allowed to have access. Access permission information is maintained to specify which clients are allowed to have access and what kind of access. A method and system are introduced to use a radix tree to store access permission information in a cache, therefore allowing the storage server to quickly retrieve access information relevant to a particular client. One advantage of using radix tree to maintain access permission information is that radix tree is very efficient at storing hierarchical information, such as IP addresses. Radix tree is also very efficient at representing subnets in particular.

20 Claims, 11 Drawing Sheets

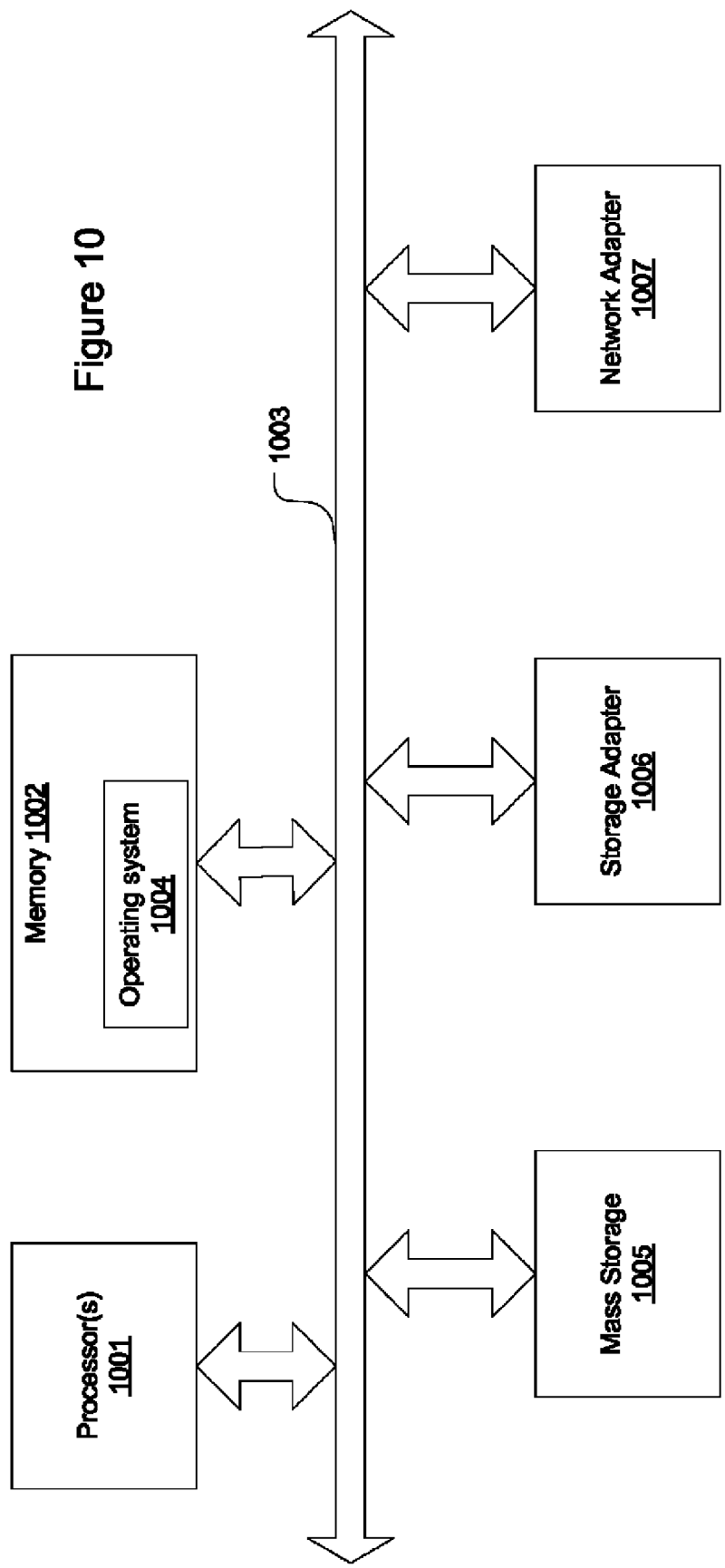

METHOD AND SYSTEM FOR STORING CLIENTS' ACCESS PERMISSIONS IN A CACHE

FIELD OF THE INVENTION

At least one embodiment of the present invention pertains to storage systems, and more particularly, to storing clients' access permissions in a cache of a storage server.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as servers made by Network Appliance, Inc. (NetApp®) of Sunnyvale, Calif.

In storage servers, data can be stored in logical containers called volumes, which may be co-extensive with, or subsets of, aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A file system logically organizes information as a hierarchical structure of name directories and file objects (hereinafter "directories" and "files") on the disks. Although a volume or file system (as those terms are used herein) may store data in the form of files, that is not necessarily the case. That is, a volume or file system may store data in the form of other units, such as blocks or Logical Unit Numbers (LUNs).

A storage server can have one or more file systems that are exported to clients. To manage which clients have access to a particular exported file system, the storage server maintains clients' access permissions for the exported file system. Based on the access permissions, the storage server determines whether a request coming from a particular client (e.g., a read or write request) should be authorized or denied. Clients' access permissions may be stored in a cache of the storage server to speed up the storage server's response upon receiving a request from a client. According to known techniques, the access permissions can be organized as a hash table in the cache. However, there are several shortcomings associated with the use of a hash table. For example, when a new entry needs to be inserted into a hash table that is already full, resizing the hash table is expensive and complicated. Furthermore, a hash table is not particularly efficient in using the cache's limited storage resource, therefore, reducing the performance of the storage server in handling clients' access requests. Thus, a better way to organize clients' access permissions in a cache of a storage server is needed.

SUMMARY OF THE INVENTION

The present invention includes a method and system for storing clients' access permissions in a cache. The method includes receiving a request to access a file system, or any other resource maintained by a storage server, and searching a radix tree stored in a cache memory for information to determine whether the request should be allowed.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 10 is high level block diagram of a processing system, which can be the storage server shown in FIG. 1.

DETAILED DESCRIPTION

Figure 1:
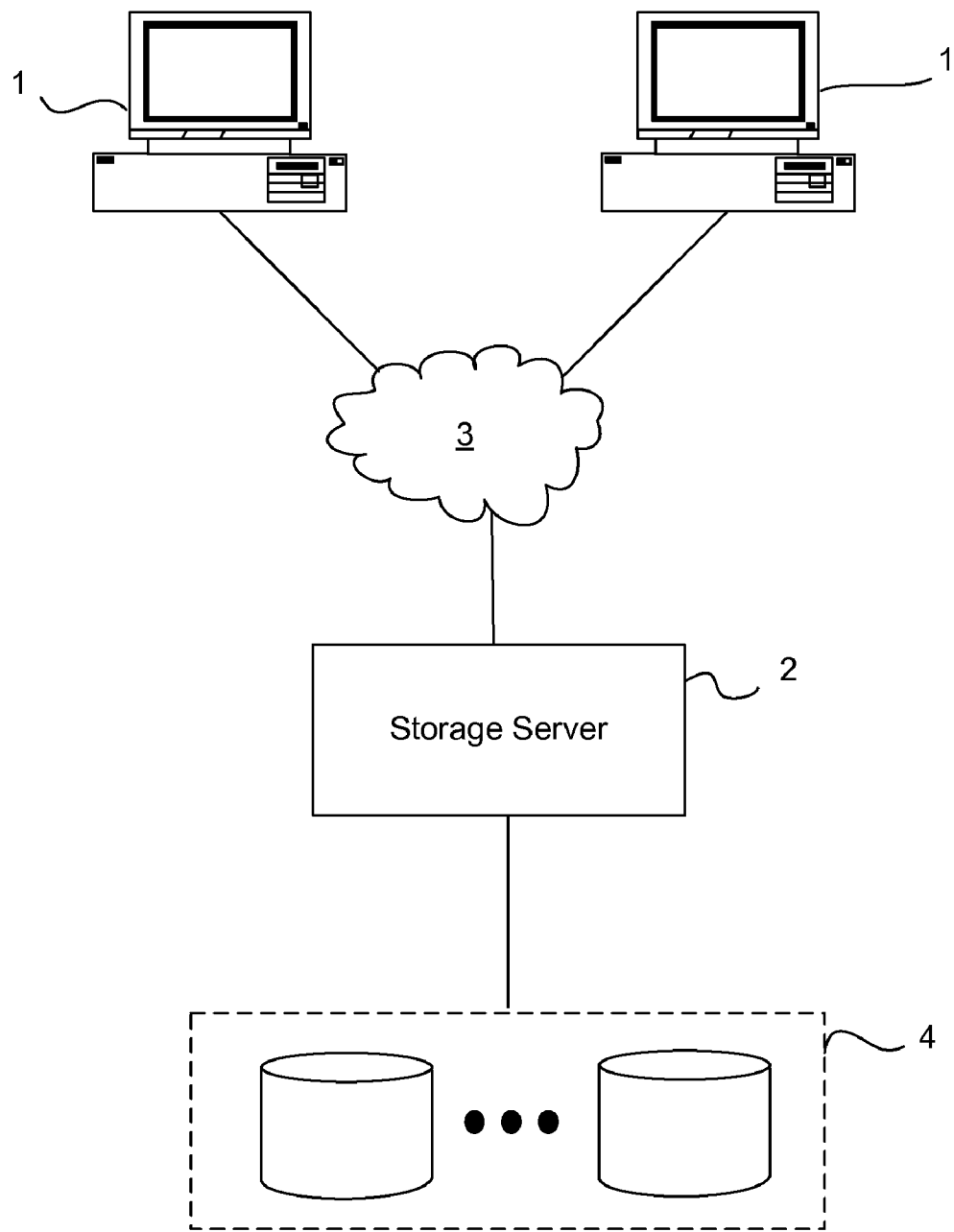
FIG. 1 illustrates a network environment in which the present invention can be implemented.

A method and system of using a radix tree to store clients' access permissions in a cache are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention includes a technique of using a radix tree to store clients' access permissions in a cache of a storage server. A storage server maintains a number of exported file systems. For each exported file system, certain clients are allowed to have access (e.g., read access, write access, root access, etc.) and certain other clients are not allowed to have access. Read access permission only allows read operations. Write access permission usually carries the permission for read access as well. Root access permission gives the kind of access right usually available only to a system administrator. Thus, for each exported file system, a data structure containing clients' access permissions is created to specify which clients are allowed to have access and what kind of access each client is allowed to have (e.g., read access, write access, root access, etc.) In one embodiment, such a data structure containing clients' access permissions maintains a rule. A rule associates corresponding access permissions with an IP address of a client. In response to a client's request, the storage server accesses the rule and determines whether the request should be granted or denied. As used herein, the word "dataset" refers to an exported file system or any other resource to which a client issues an access request.

According to the technique introduced here, clients' access permissions are stored as a radix tree in a cache, which allows the storage server to quickly retrieve access information regarding a particular client. A radix tree is a data structure based on a trie that is used to store a set of strings. A trie is an ordered tree structure that is used to store an associative array where the keys are strings. One advantage of using a radix tree to store clients' access permissions is that a radix tree is very efficient at storing hierarchical information, such as IP addresses. A radix tree is also very efficient at representing subnets in particular. A subnet (short for subnetwork) is a range of addresses (e.g., IP addresses) within an address space that is assigned to an organization. Using a radix tree to store clients' access permissions reduces both access time and memory consumption, and increases the likelihood of hitting the nodes in cache, thereby increasing the storage server's efficiency.

Although the present invention is described in the context associated with exported file systems, one skilled in the art can readily appreciate that the principle and spirit of the present invention apply to other similar scenarios, which are not necessarily related to access permissions to exported file systems. Similarly, the use of IP addresses, subnets, etc. in the description of the present invention by no means limits the scope of the present invention. The present invention applies to other types of addresses as well.

FIG. 1 shows a network environment in which the present invention can be implemented. In FIG. 1, a storage server 2 is coupled locally to a storage subsystem 4. The storage server 2 is also coupled through an interconnect 3 to a number of clients 1. The storage subsystem 4 is managed by the storage server 2, which receives and responds to various read and write requests from the clients 1, directed to data stored in or to be stored in the storage subsystem 4.

Each of the clients 1 may be, for example, a conventional personal computer (PC), server class computer, workstation, or the like. The storage server 2 may be, for example, a file server used in a NAS environment (a "filer"), a block-based storage server such as used in a storage area network (SAN), or other type of storage server. In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as a Redundant Array of Inexpensive Disks (RAID), in which case the storage server 2 accesses the storage subsystem 4 using an appropriate RAID protocol (e.g., RAID 4, RAID 5, RAID 6, etc.).

Figure 2:
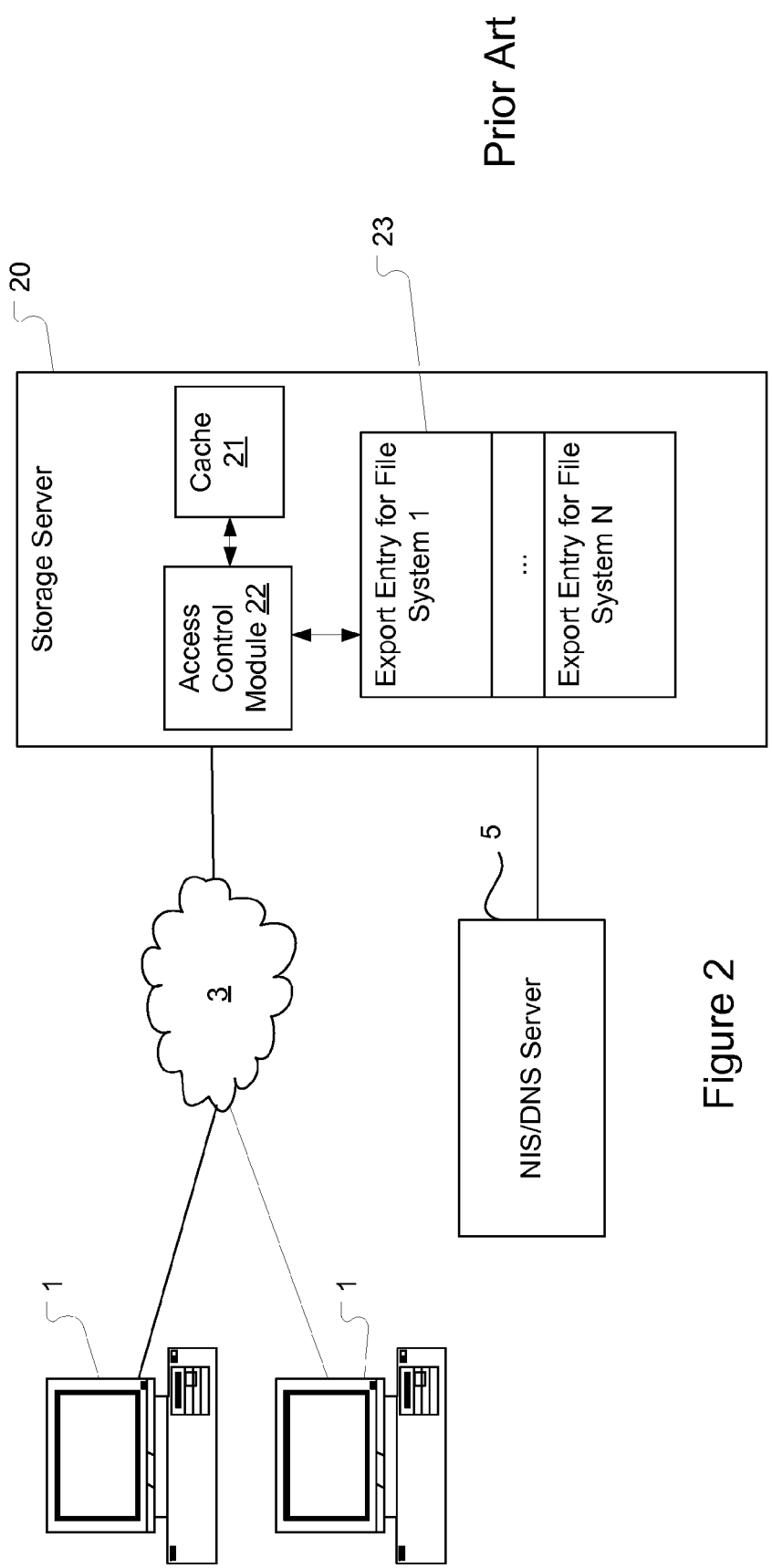
FIG. 2 illustrates a mechanism of storing clients' access permissions in a cache of a storage server such as shown in FIG. 1.

FIG. 2 illustrates a mechanism of storing clients' access permissions in a cache of a storage server such as shown in FIG. 1. As shown, the storage server 20 includes an access control module (ACM) 22, a cache 21, and an export entry table 23. The export entry table 23 includes an entry for each exported file system maintained by the storage server 20. Each entry of the export entry table 23 contains, among other things, clients' access permissions specifying clients' access permissions to the corresponding exported file system. In one embodiment, the clients' access permissions are organized as one or more rules, and the export entry table 23 is stored on a local storage device (e.g., the mass storage 1005 shown in FIG. 10) of the storage server 20. A part of the export entry table 23 may be read into a main memory (e.g., the memory 1002 shown in FIG. 10) of the storage server. In one embodiment, such access permissions are categorized into three different access permissions: read access permission, write access permission and root access permission. A rule identifies access to a file system from clients 1 which can be represented by IP addresses, subnets, domain names, host names, or netgroups. Thus, a Network Information Service (NIS) or Domain Name Service (DNS) server 5 is needed to figure out whether an IP address belongs to a hostname in the rule. In one embodiment, a client 1 can be in a different security mode, depending on the identity of the current user of client 1 in trying to access an exported file system. An example of a security mode is a role of the user (e.g., a system administrator, etc.) For each security mode, a rule is specified for an exported file system. For example, a rule may be specified as "/vol/foo sec=sys, rw=102.118.168.21, ro=foo.netapp.com, rw=102.118.167.0". In the example, "/vol/foo" refers to the exported file system (e.g., a volume); "sec=sys" means that the current security mode of the client is "sys" Unix security; and "rw=102.118.168.21" means that the client with IP address "102.118.168.21" has read and write access permissions to the exported file system "/vol/foo". The parameter "ro=foo.netapp.com" means that the client "foo.netapp.com" has root access permissions to the exported file system "/vol/foo". Further, the parameter "rw=102.118.167.0" means that the subnet "102.118.167.0" has read and write permissions to the exported file system. A rule may be shared by more than one exported file systems, if the rules for the exported file systems are the same. One of the advantages of sharing rules is that less memory or storage space is consumed. Note that for purposes of illustration, phrase "client with IP address" followed by an IP address is simplied as "client" followed by an IP address.

In operation, the ACM 22 receives a request from one of the clients 1 and determines the security mode of the client 1. In one embodiment, based on the security mode and the exported file system requested, the ACM 22 first searches the cache 21 to determine whether there is an entry for the client in the cache 21. If the cache does not contain an entry for the client, the ACM 22 inserts the request to a queue (to be processed later) and starts processing another request. If the cache contains an entry of access permissions for the client with respect to the security mode and the exported file system, the ACM 22 determines, based on the entry, whether the access request should be granted or denied.

Figure 3:
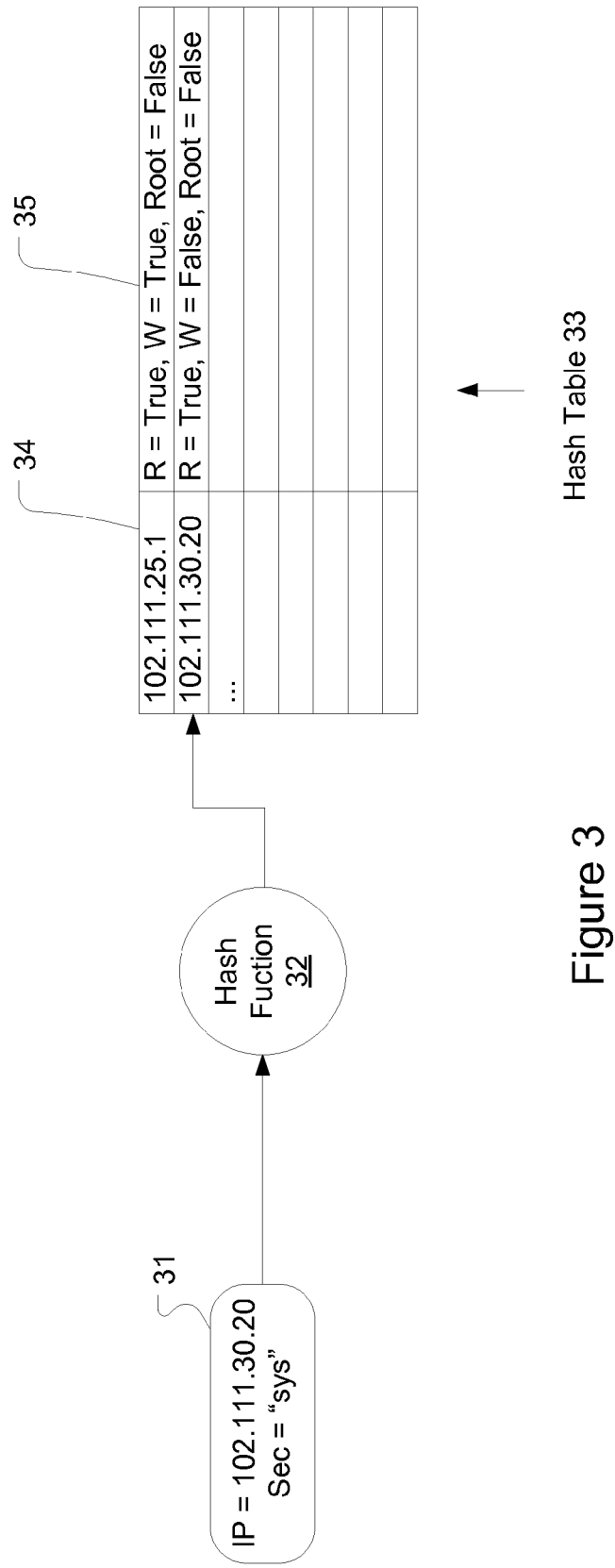
FIG. 3 illustrates a conventional mechanism of using a hash table to organize clients' access permissions in a cache.

FIG. 3 illustrates a conventional mechanism of using a hash table to organize clients' access permissions in a cache. As shown, the hash table 33 includes two columns. Column 34 records IP addresses that belong to the clients 1. Column 35 records the access permissions corresponding to each client 1. Thus, each entry of the hash table 33 specifies the access permissions for an IP address representing a client 1. In one example, the hash table represents a particular security mode. Thus, for a different security mode, a different hash table is used to store the corresponding access permissions. For example, assume that the hash table 33 represents the security mode "sys". When a request from client "102.111.30.20" is received and the client is in "sys" security mode, the hash function 32 locates the corresponding entry from the hash table 33. As shown in FIG. 3, the hash function 32 finds that the second entry of the hash table 33 matches the IP address of the client "102.111.30.20". Then, the corresponding access permissions are retrieved from column 35. As shown, the access permissions specify that client "102.111.30.20" has read access permission, but no write and root access permissions.

Figure 4:
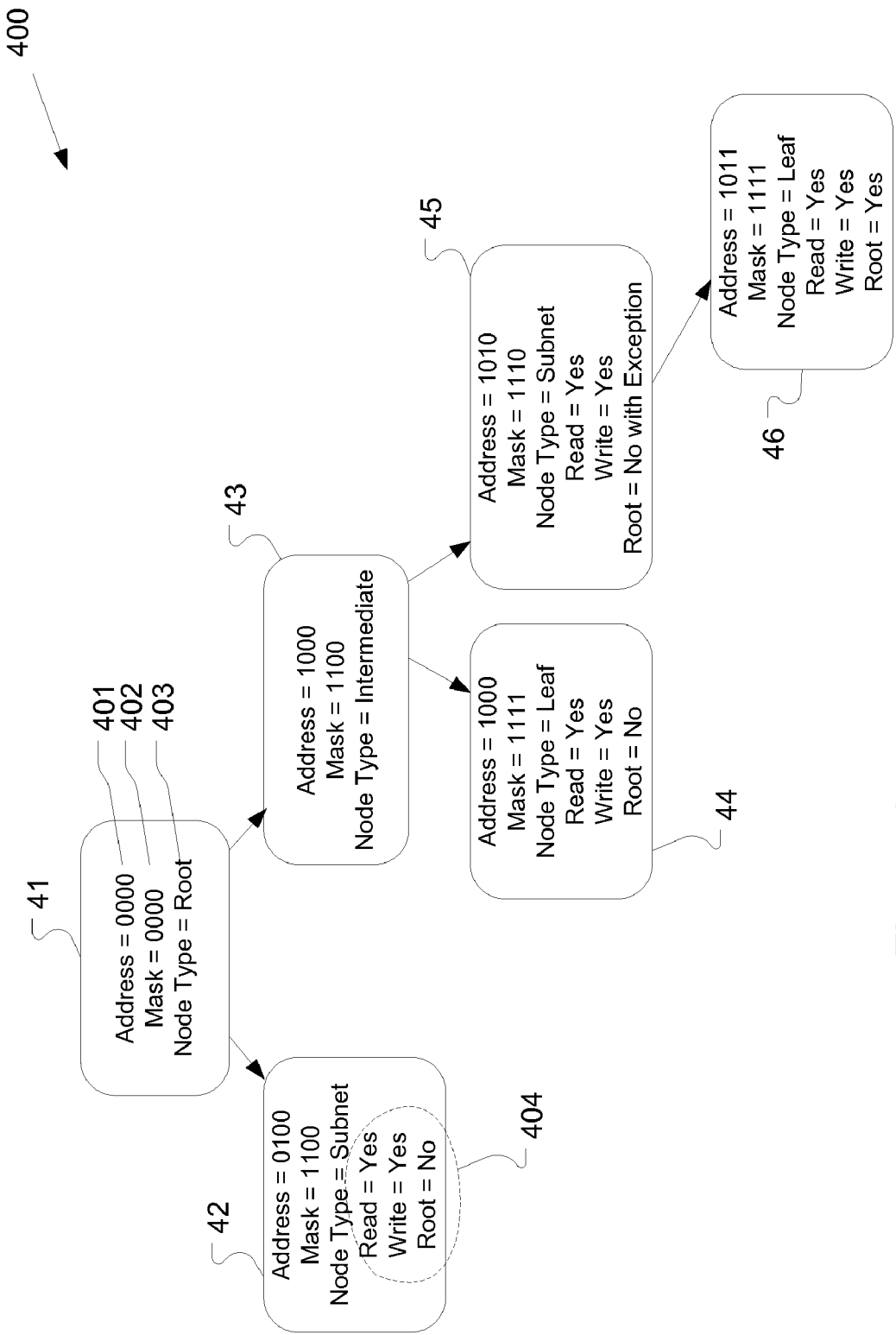
FIG. 4 illustrates a mechanism of using a radix tree to organize clients' access permissions in a cache, according to an embodiment of the present invention.

FIG. 4 illustrates a mechanism of using a radix tree to store clients' access permissions in a cache, according to an embodiment of the present invention. One advantage of using a radix tree to store clients' access permissions is that a radix tree is very efficient at storing hierarchical information, such as IP addresses. A radix tree is also very efficient at representing subnets in particular. A radix tree may be implemetned as a special form of binary tree. Note that the present invention may also be implemented in a non-binary radix tree. As shown in FIG. 4, each branch of the radix tree 400 is keyed by one bit of an IP address. An IP address has 32 bits (for IPv4) or 128 bits (for IPv6). However, to simplify the drawings and discussions below, only four bits are used in the figures for illustration. The bits of an IP address are parsed from highest order to lowest order in sequence. Each node of the radix tree can represent an IP address, a subnet, or an interior node. An interior node can be used to maintain the radix tree's structure. A node within the tree contains an address 401 indicating the IP address, a mask 402 indicating which bits of that node's address have a final value for that node and all of its descendants. For example, the root node 41 has an address of 0000 and a mask of 0000. The child node on the right (node 43) would lead to all addresses of the form 1xxx, and the child node on the left (node 42) would lead to all addresses of the form 0xxx. Each of the nodes 42 and 43 would have a mask with at least the leftmost bit set to 1. However, if either branch of the tree is not fully populated, it is possible for the next level node to have a larger mask, covering more bits. For example, node 43's mask is 1100, instead of 1000.

Each node further includes a node type 403. In one embodiment, there are four node types: root, interior, leaf, and subnet. "Root" indicates that the corresponding node is the root node of the radix tree. "Interior" indicates that the corresponding node is created for maintaining the radix tree's binary structure (i.e., each interior node has two children). An interior node does not contain access permission information. "Leaf" indicates that the corresponding node does not have any child and that the node represents a single IP address. A leaf node contains access permission information regarding the client having the IP address (or regarding the IP address for purposes of simplifying the illustration). "Subnet" indicates that the corresponding node represents a subnet instead of a single IP address. That is, any IP address within the subnet is represented by the node. All IP addresses within a subnet share the same access permissions, with exceptions that will be discussed below. Thus, instead of using a number of nodes to represent these IP addresses, only one node is required to represent the subnet. For example, node 45 is a subnet node, and all IP addresses within the subnet 1010 (with a subnet mask 1110) share the same access permissions 404.

Each node, except an interior node, can have one or more values representing access permissions. A value is assigned to an access permission (e.g., read access permission, write access permission, root access permission, etc.) of a node to indicate whether the client(s) represented by the node has (or have) the corresponding access permission. For example, the "Yes" value indicates that the client(s) has (or have) the corresponding access permission. The "No" value indicates that the client(s) does not (or do not) have the corresponding access permission. The "Yes with exception" value is used specifically for a subnet node, which means that all clients, but with an exception, within the subnet have the corresponding access permission. Similarly, the "No with exception" values indicates that all clients, but with an exception, within the subnet do not have the corresponding access permission. The "Undetermined" value indicates that the corresponding access permission is undetermined for the client(s). Note that other values may be chosen to indicate the same meaning as "Yes", "No", "Yes with exception", or "No with exception".

As mentioned above, a subnet may have one or more exceptions. That is, a client with an IP address within the subnet may have different access permissions from the rest of the clients of the subnet. In that case, the access permission information of the subnet node is specified differently from those of a subnet node without any exception. For example, node 45 is a subnet node. The root access permission is specified as "no with exception", meaning all clients, but with one or more exceptions, within the subnet has no root access permission. The exceptional client is represented by a child of the subnet node. In FIG. 4, node 46 represents the exception and it has root access permission, which is different from the rest of the clients in the subnet.

In one embodiment, the general construction of the radix tree 400 is that each node either has no child or has exactly two children, except when the node is a subnet node or a root node. Thus, when a node is inserted into or deleted from the tree 400, interior nodes need to be inserted to maintain the above general construction rule. Node insertion and deletion will be discussed in detail below.

As discussed above, for each security mode, a rule may be specified for an exported file system. For each rule that allows/denies certain clients' access to the exported file system, a radix tree is created in the cache 21. A rule may be shared by more than one exported file systems if the corresponding rules for the exported file systems are the same. In such cases, one radix tree is created to represent the rule and those exported file systems may share the same radix tree.

When doing a lookup in the radix tree 400, a query context is maintained during the traversal from the root node 41 to a leaf node, e.g., node 44, to store any intermediate or final result regarding the lookup. The query context is a data structure that contains a value for each access permission (e.g., read, write, root, etc.) inquired. The initial value of each access permission is specified as undetermined in the query context. The value of each access permission in the query context will change to "Yes", "No", "InProgress", or "Delayed" if a terminal node is reached, for any access permission that is requested. Values for access permissions that are not requested are left in the undetermined state. A terminal node is a node that contains access permission information for all the inquired access permissions. For example, a leaf node is a terminal node. A subnet node can also be a terminal node. An interior node, however, is not a terminal node, because an interior node does not contain access permissions information. If a terminal node is not reached, the search continues. If a terminal node is reached, the terminal node's access permission information will be used to resolve the query (i.e., changing the value of each access permission inquired in the query).

A radix tree in cache can be stored on a secondary storage (e.g., the mass storage 1005 shown in FIG. 10) of the storage server. In case the storage server is shut down and rebooted again, the radix tree stored on the secondary storage of the storage server can be quickly loaded into the cache, thus improving the responsiveness of the storage server. In addition, besides the types of attributes described above, each node can maintain more types of information.

Figure 5A:
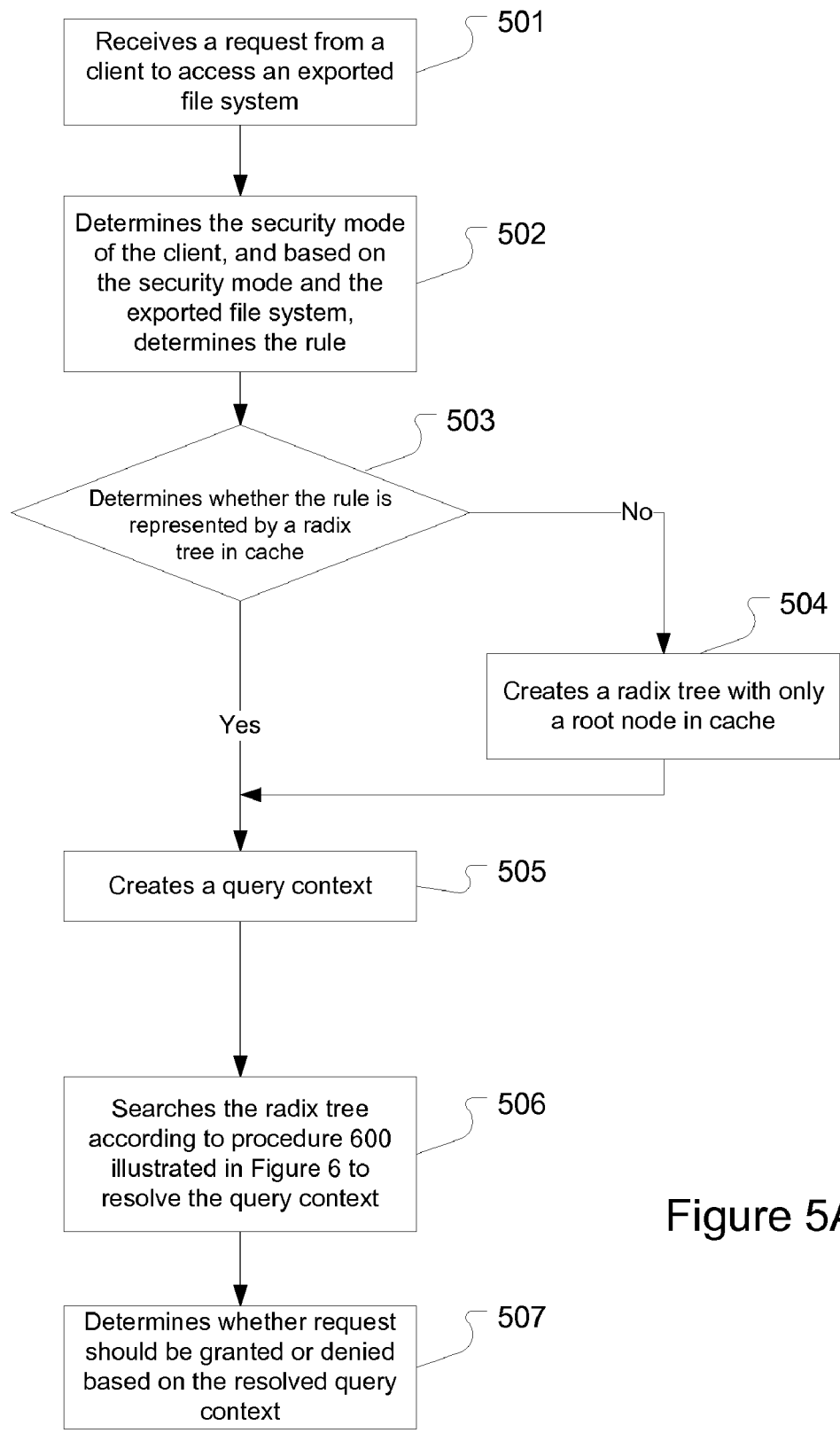
FIG. 5A is a flow diagram illustrating a process of using cached access information to determine whether a client's request should be granted or denied, according to an embodiment of the present invention.

FIG. 5A is a flow diagram illustrating a process of using cached access information to determine whether a client's request should be granted or denied, according to an embodiment of the present invention. It is assumed that the clients' access permissions are stored as rules as discussed above. At block 501, the ACM 22 receives a request from a client 1 to access an exported file system. At block 502, the ACM 22 determines the security mode of the client 1. Based on the security mode and the identity of the exported file system, the ACM 22 determines the corresponding rule from the export entry 23. At block 503, the ACM 22 determines whether a radix tree has already been created in the cache 21 to represent the rule. If the outcome of block 503 is negative, at block 504, a radix tree with only a root node is created in the cache 21 to represent the rule. Alternatively, when a file system is exported, a radix tree is created for each rule of the exported file system. Accordingly, the steps in blocks 503 and 504 would be unnecessary. In one embodiment, the root node contains information identifying the security mode and the identity of the exported file system, thus, allowing the ACM 22 to find the radix tree corresponding to a particular rule. If there is already a radix tree corresponding to the rule in the cache 21 (block 503), then at block 505, the ACM 22 creates a query context. In one embodiment, a query context is represented by a data structure containing the IP address of the requesting client 1 and the access permissions inquired (e.g., read, write, root, etc.) At block 506, the ACM 22 then searches the radix tree according to, for example, a procedure 600 illustrated in FIG. 6. The procedure 600 searches the radix tree to resolve the query context. At block 507, the ACM 22 determines whether the client's request should be granted or denied based on the resolved query context.

Figure 5B:
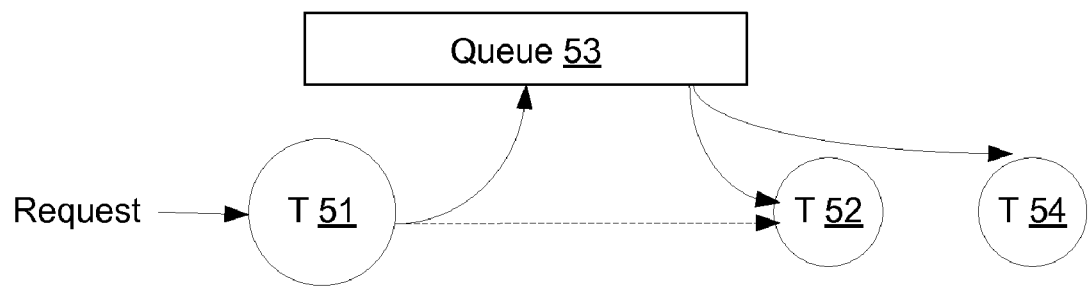
FIG. 5B is a block diagram illustraing a control logic in the thread level of the Access Control Module, according to an embodiment of the present invention.

FIG. 5B is a block diagram illustraing a control logic in the thread level of the Access Control Module, according to an embodiment of the present invention. As shown, a first thread 51 receives a request from a client 1. As discussed in FIG. 5A, the thread 51, based on the client's security mode and the identity of the exported file system targeted to, determines the corresponding rule. The thread 51 also determines whether a radix tree corresponding to the rule already exists in the cache 21 and whether the radix tree has a corresponding node representing the client's IP address. If either the radix tree does not exist yet or the tree does not have a node representing the IP address, the storage server 2 initiates a second thread 52 to retrieve relevant information from the rule stored on a secondary storage and to create a corersponding node in the radix tree to represent the client's IP address. Note that the thread 52 would need to firstly create a new radix tree if no radix tree exists to represent the rule. However, as discussed above, if the radix tree has already been created when the file system is exported, the thread 52 only needs to retrieve relevant information from the rule to create a corresponding node in the radix ree to represent the client's IP address. In one embodiment, instead of blocking itself to wait until the thread 52 finishes the task, thread 51 inserts the request into a queue 53 and frees itself to process other requests. Since the number of threads running in the storage server 2 is limited, the above mechanism allows maximum number of threads to process incoming requests, and therefore, increasing the storage server's responsiveness. After the thread 52 creates the corresponding node, thread 52 retrieves the request from the queue 53 and resolves the request. Alternatively, a third thread 54 may be used to retrieve the request from the queue 53 and to resolve the request after the thread 52 creates the corresponding node.

Figure 6:
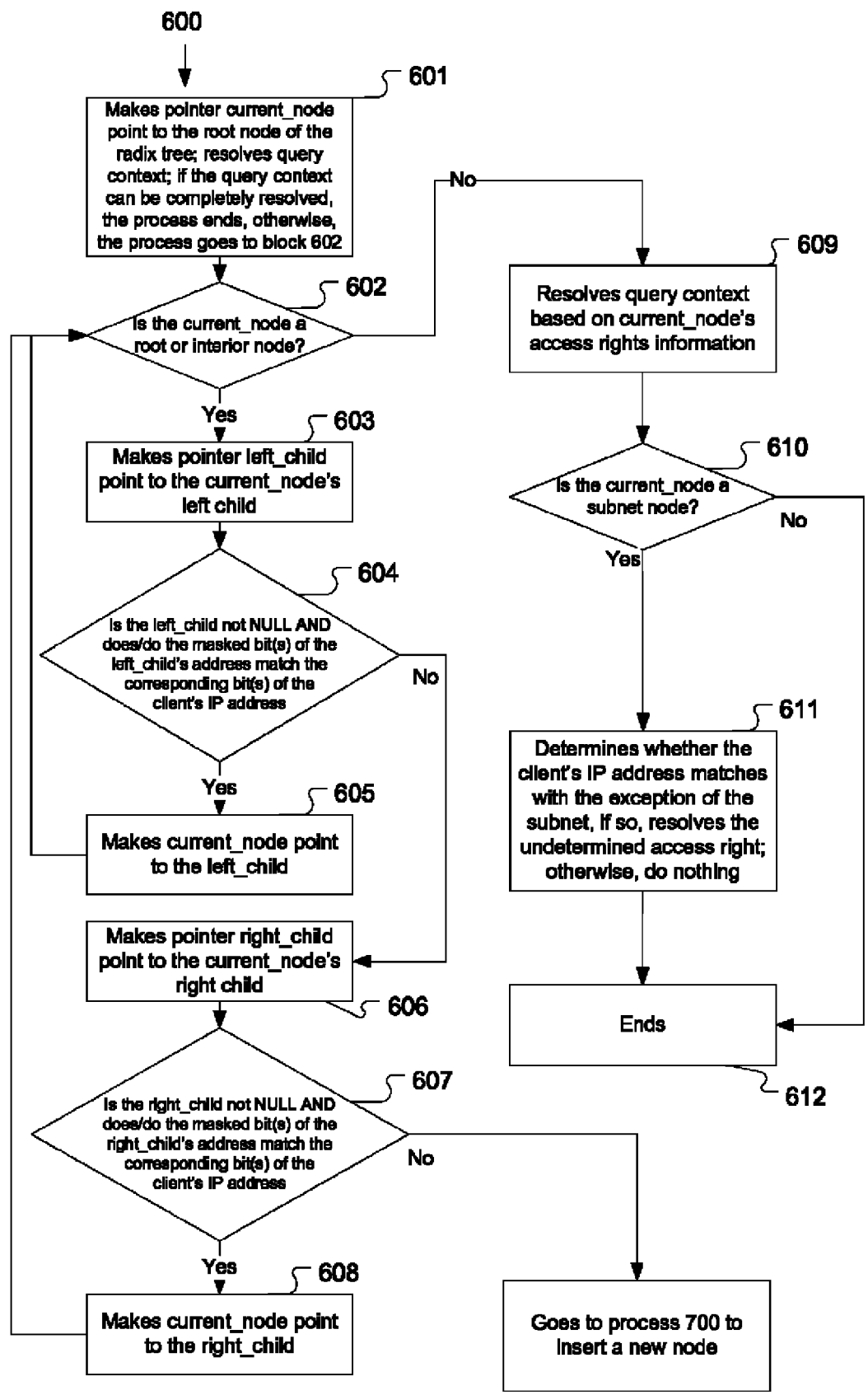
FIG. 6 is a flow diagram illustrating a process of searching a radix tree to resolve a query context, according to an embodiment of the present invention.

FIG. 6 is a flow diagram illustrating a process of searching a radix tree to resolve a query context, according to an embodiment of the present invention. It is assumed that a rule has been identified based on the security mode of the requesting client 1 and the identity of the exported file system to which the client's request is targeted. It is also assumed that a radix tree has been created in the cache (such as cache 21 shown in FIG. 2) to represent part of the rule.

A pointer current_node is used as a moving cursor for traversing the radix tree. At block 601, the pointer current_node initially points to the root node of the radix tree. Note that a root node may also contain access permission information, and if so, the access permission information stored in the root node applies to all clients. Thus, at block 601, the process 600 tries to resolve the query context based on the access permission information stored in the root node. If the query context can be completely resolved at block 601, the process ends. Otherwise, the process goes to block 602. At block 602, the process determines whether the current_node is a root node or an interior node. If the node is either a root node or an interior node, at block 603, the process makes a pointer left_child to point to the current_node's left child. At block 604, the process determines whether the left_child is NULL and whether the masked bit(s) of the left_child's address match(es) the corresponding bit(s) of the client's IP address. Here, a masked bit refers to a bit having a final value for a node and all its descendants. For example, if a node's address is 1011 and the node's mask is 1100, then the highest two bits "10" of the node's address are masked bits of the node. Thus, if the client's IP address is 1000, then the masked bits of the node match the corresponding bits (the two highest bits) of the client's IP address. If, however, the client's IP address is 1100, then the masked bits of the node do not match the corresponding bits of the client's IP address.

If the left_child is not NULL and the masked bit(s) of the left_child's address match(es) the corresponding bit(s) of the client's IP address, which is determined at block 604, the process makes the current_node to point to the left_child, at block 605. The process flow then goes back to block 602 after block 605. If the left_child is NULL or the masked bit(s) of the left_child's address do(es) not match the corresponding bit(s) of the client's IP address, which is determined at block 604, the process makes a pointer right_child point to the current_node's right child, at block 606. At block 607, the process determines whether the right_child is NULL and whether the masked bit(s) of the right_child's address match(es) the corresponding bit(s) of the client's IP address. If yes, at block 608, the process makes the current_node point to the right_child, and the process flow goes back to block 602. If the right_child is NULL or the masked bit(s) do(es) not match the corresponding bit(s) of the client's IP address, the process goes to procedure 700 illustrated in FIG. 7 to insert a new node to represent the client's IP address. Here, that a pointer is NULL means the pointer does not have a target. A person with ordinary skill in the art would appreciate that a different value may be used to represent the same meaning.

Back to block 602, if the process determines that the current_node is neither a root node nor an interior node, then the process goes to block 609. In one embodiment, if a node is not a root node or an interior node, then the node is either a leaf node or a subnet node. At block 609, the process resolves the query context based on access permission information stored in the current_node. At block 610, the process determines whether the current_node is a subnet node. If no, the process ends at block 612. If the current_node is a subnet node, at block 611, the process determines whether the client's IP address is an exception of the subnet. For example, as shown in FIG. 4, node 46 represents an exception of the subnet represented by node 45. In one embodiment, a subnet is allowed to have one or more exceptions. The exceptions may be represented by a list of nodes linked to a special pointer of the subnet node (e.g., an exception pointer). Alternatively, the exception list may be pointed to be either the right child or the left child pointer of the subnet node. To determine whether the client's IP address match one of the exceptions, the process may search the exception list to determine whether one of them matches the IP address. If the client's IP address is one of the exceptions, then resolve the query context accordingly. For example, node 45's root access information specifies "No with Exception". If the client's IP address is 1011, then the client should have root access permission even though the whole subnet 1010 (with subnet mask 1110) does not have root access permission to the exported file system.

Figure 7:
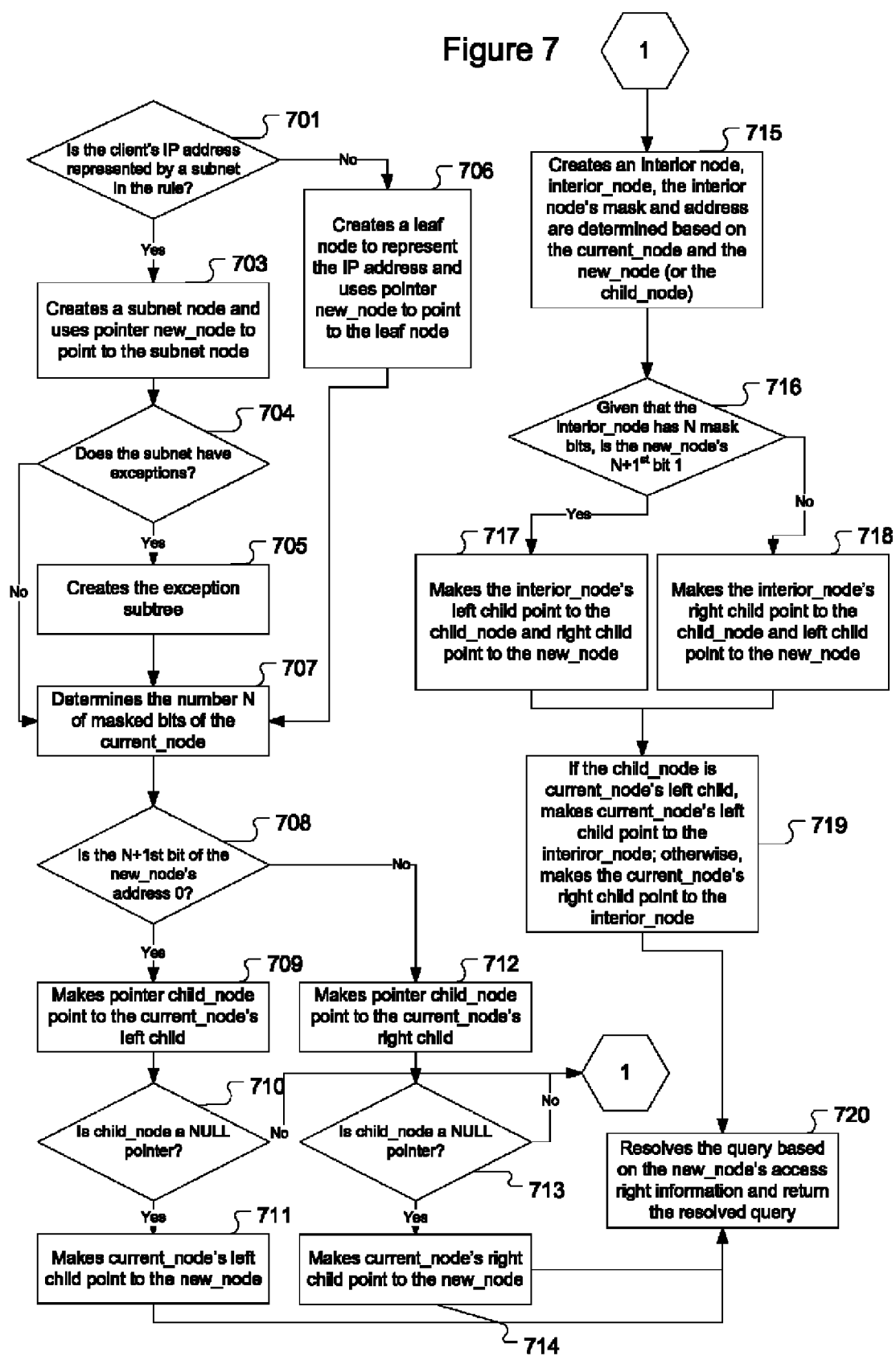
FIG. 7 is a flow diagram illustrating a process of inserting a new node into a radix tree in a cache, according to an embodiment of the invention.

FIG. 7 is a flow diagram illustrating a process of inserting a new node into a radix tree in a cache, according to an embodiment of the invention. It is assumed that the process 700 illustrated in FIG. 7 is entered from block 607 of FIG. 6. At block 701, the process determines whether the client's IP address is represented by a subnet in the rule. If no, the process creates a leaf node representing the IP address (with a mask of all 1s). The process uses a pointer new_node to point to the newly created leaf node.

If the IP is represented by a subnet, determined at block 701, at block 703, the process creates a subnet node to represent the whole subnet which including the client's IP address. The subnet mask is used as the mask for the subnet node. The process makes the new_node pointer point to the newly created subnet node. At block 704, the process determines, based on the rule, whether the subnet has any exception. If so, for each exception, an exception node is created. If there is more than one exception, all exception nodes are linked as a subtree under the subnet node.

At block 707, the process determines the number N of masked bits of the current_node. At block 708, the process determines whether the number $N+1^{st}$ of the bit of the new_node's address is 0 or 1. If it is 0, that means the new_node should be inserted into the current_node's left branch. Otherwise, the new_node should be inserted into the current_node's right branch. At block 709, the process creates a pointer child_node and makes the pointer child_node point to the current_node's left child. At block 710, the process determines whether child_node is NULL. If child_node is NULL (determined at block 710), at block 711, the process makes the current_node's left child pointer point to the new_node. At block 712, the process makes the child_node pointer point to the current_node's right child. If, at block 713, the child_node is NULL, then, at block 714, the process makes the current_node's right child pointer point to the new_node.

If, either at block 710 or at block 713, the child_node is not NULL, the process goes to block 715. At block 715, the process creates an interior node, interior_node. The interior_node's mask and address are determined based on the masks and addresses of the current_node and the child_node (or the new_node). In one embodiment, the interior_node's mask is set as the current_node's mask with one more bit set as 1. For example, if the current_node's mask is 1000, then, the interior_node's mask will be 1100. Assuming the number of masked bits is M, then the interior_node's address is set as the first M bits of either the new_node's address or the child_node's address followed by all zeros. For example, if the child's address is 1101 and the number of the interior_node's masked bits is 2, then, the interior_node's address would be 1100.

Yet in another embodiment of the present invention, the addresses and masks of the new_node and the child_node are compared to find out the highest M masked bits that match. For example, assume the new_node's address and mask are 1000 and 1111, respectively. Assume the child_node's address and mask are 1010 and 1110, respectively. Then, the highest two masked bits of the two nodes match. Then, the interior_node's mask will be set as the highest M bits as 1 and the rest bits as 0. The highest M bits of the interior_node's address will be set the same as the highest M bits of either the new_node's address or the child_node's address (since they are the same) followed by all zeros. For example, following the above example, the interior_node's address and mask would be 1000 and 1100, respectively.

At block 716, given that the interior node has N mask bits, the process determines whether the $N+1^{st}$ bit of the new_node's address is 1. If the determination is positive, then the process goes to block 717. At block 717, the interior_node's left child points to the child_node and the interior_node's right child points to the new_node. If the determination at block 716 is negative, the interior_node's left child points to the new_node and the interior_node's right child points to the child_node. At block 719, if the child_node is the current_node's left child, the process makes the current_node's left child to point to the interior_node. Otherwise, the process makes the current_node's right child to point to the interior_node.

At block 720, the process resolves the query context based on the access permissions stored in the new_node and returns the resolved query context.

Figure 8:
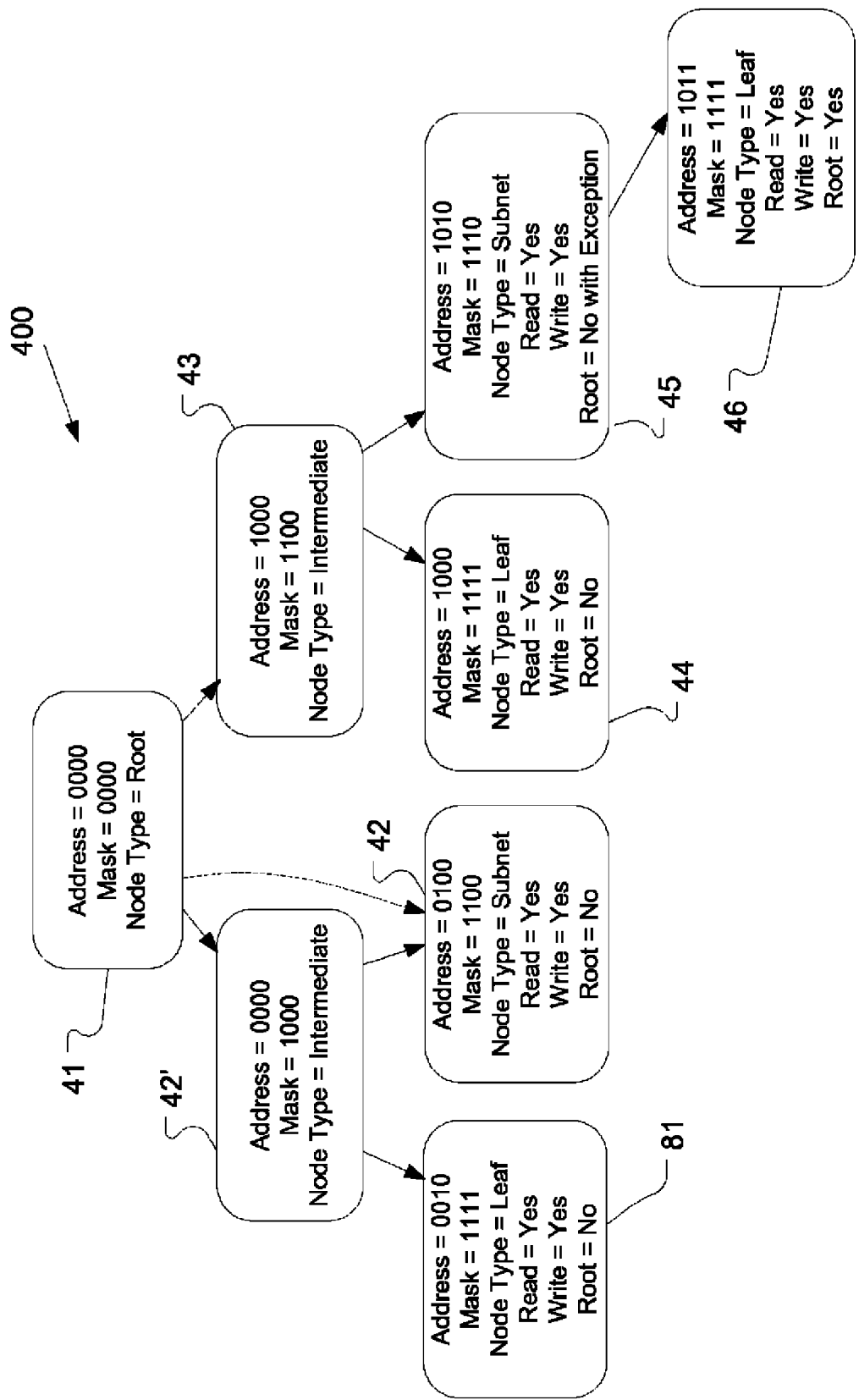
FIG. 8 is a block diagram illustrating insertion of a node into a radix tree such as shown in FIG. 4.

FIG. 8 is a block diagram illustrating an insertion of a node into a radix tree such as shown in FIG. 4. As shown, the newly inserted node is node 81. To insert node 81, an interior_node 42' is created. After the insertion, the root node's left child pointer is made to point to the created interior_node 42'. The old node 42, which was pointed to by the root node before the insertion, is now pointed by the interior_node 42's right child pointer. The interior_node 42's left child pointer points to the newly inserted node 81.

Node deletion is initiated from the leaf nodes. To delete a leaf node with no sibling (for example, when the leaf node is an exception of a subnet node), the node is simply removed from the tree. Node deletion of a leaf node that has a sibling will result in deletion of the parent (an interior node or a subnet node) and the promotion of the sibling to the position of the parent, unless the parent is a subnet node. If the parent is a subnet node, the child is simply deleted, and the sibling is left as the only child of the parent subnet node. If the node to be deleted is a subnet node, the handling depends on whether or not the subnet node also has descendants (exception nodes, for example). In the case that a subnet node does not have any exception node in the tree, the handling is identical to the deletion of any leaf node. In the case of a subnet node with exception node(s), if there is one exception node, the subnet node is deleted, and the exception node is promoted to the position of the subnet node. If there are more than one exception nodes and the exception nodes are linked as a list, the subnet node is convereted into an interior node and the exception list will be restructured as a subtree with the interior node convereted from the subnet node working as the subtree's root node.

Figure 9:
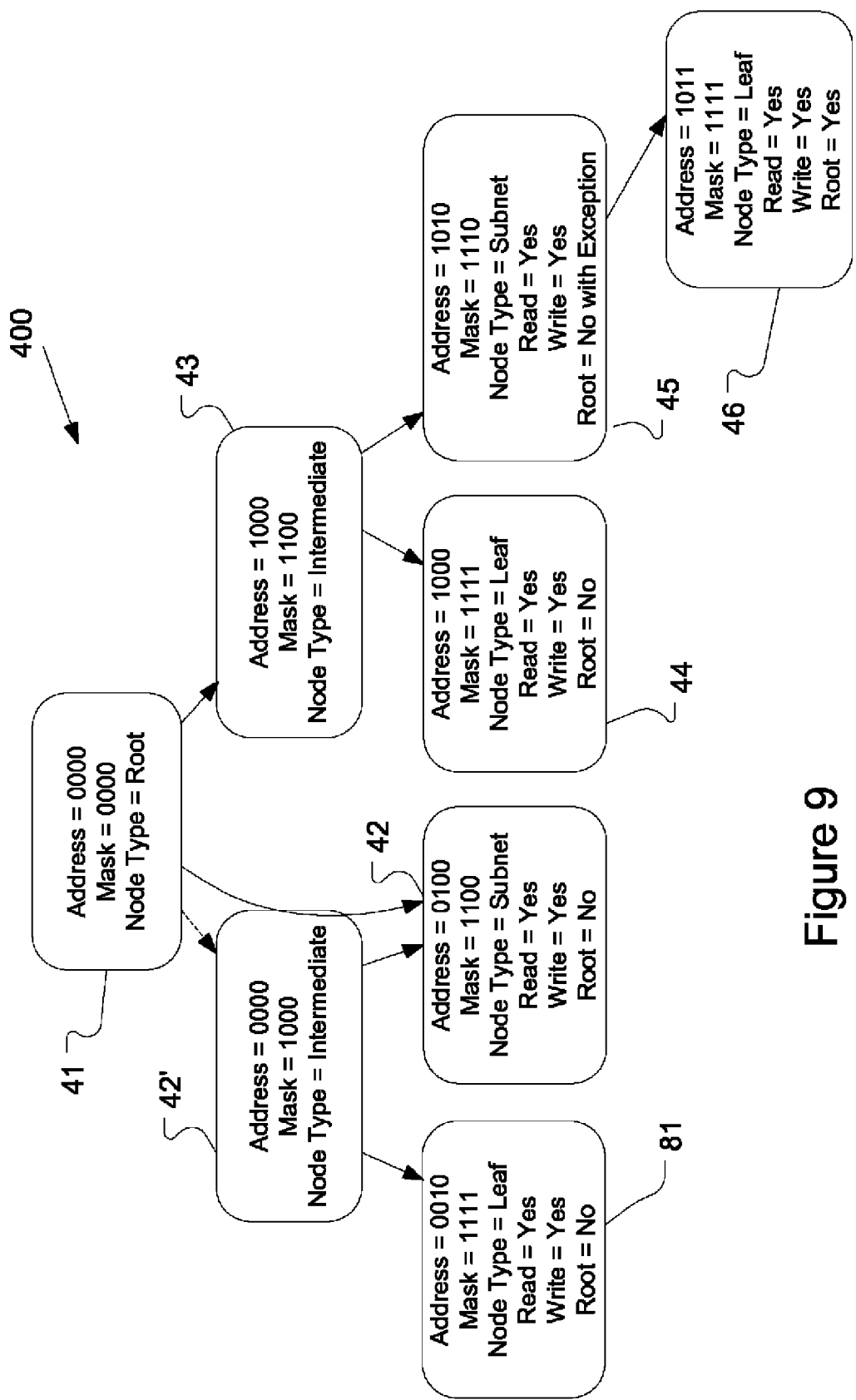
FIG. 9 is a block diagram illustrating a deletion of a node from a radix tree such as one shown in FIG. 8.

FIG. 9 is a block diagram illustrating a deletion of a node from a radix tree such as one shown in FIG. 8. As shown, node 81 is the node to be deleted from the tree. According to the process discussed above, the parent node of node 81 is an interior node, node 42'. The parent node 42' would also be deleted because of the deletion of node 81. The sibling node of node 81 is node 42. After the deletion of nodes 81 and 42', node 42 is promoted the position held by node 42'. That is the root node 41's left child pointer is made to point to node 42. Thus, the tree, after the deletion of node 81, is the same as the tree before the insertion of node 81.

FIG. 10 is high level block diagram of a processing system, which can be the storage server 2 shown in FIG. 1. Certain standard and well-known components which are not germane to the present invention are not shown. The processing system includes one or more processors 1001 coupled to a bus system 1003.

The bus system 1003 in FIG. 10 is an abstraction that represents any one or more separate physical buses and/or point-to-point connections, connected by appropriate bridges, adapters and/or controllers. The bus system 1003, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 1001 are the central processing units (CPUs) of the processing system and, thus, control the overall operation of processing system. In certain embodiments, the processors 1001 accomplish this by executing software stored in memory 1002. A processor 1001 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1002 coupled to the bus system 1003. The memory 1002 represents any form of random access memory (RAM), read-only memory (ROM), flash memory, or a combination thereof. Memory 1002 stores, among other things, the operating system 1004 of the processing system.

Also connected to the processors 1001 through the bus system 1003 are a mass storage device 1005, a storage adapter 1006, and a network adapter 1007. Mass storage device 1005 may be or include any conventional medium for storing large quantities of data in a non-volatile manner, such as one or more disks. The storage adapter 1006 allows the processing system to access external storage systems. The network adapter 1007 provides the processing system with the ability to communicate with remote devices and may be, for example, an Ethernet adapter or a Fibre Channel adapter.

Memory 1002 and mass storage device 1005 store software instructions and/or data, which may include instructions and/or data used to implement the techniques introduced here.

Thus, a method and system for storing clients' access permissions in a cache have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    receiving, at a storage server, a request to access a dataset maintained by the storage server;
    searching, by the storage server, a radix tree for access permission information associated with an identifier to determine whether the request should be allowed, the radix tree comprising a leaf node specifying access permission information associated with an IP address and a subnet node specifying access permission information shared by a plurality of IP addresses within a subnet, the subnet node specifying an exception operative to override the access permission information for an IP address within the subnet, and wherein the radix tree is stored in a cache memory; and
    if the access permission information is not found in the radix tree, queuing the request until the access permission information is retrieved from a secondary storage.

2. The method of claim 1, wherein the radix tree further comprises a root node specifying a root of the radix tree and an interior node containing two child nodes.

3. The method of claim 1, wherein the leaf node and the subnet node stores an identifier to identify a corresponding client.

4. The method of claim 3, wherein the identifier comprises an Internet Protocol (IP) address.

5. The method of claim 3, wherein the identifier in the subnet node identifies a subnet of the plurality of subnets.

6. The method of claim 5, wherein the access permission information for an IP address associated with the exception is specified in the leaf node.

7. The method of claim 1 further comprising:
    if said searching returns no access permission information, retrieving a data structure for access permission information associated with an IP address; and
    updating the radix tree to include the access permission information associated with the IP address, wherein the data structure comprises a rule stored on a secondary storage of the storage server.

8. The method of claim 1 further comprising:
prior to searching the radix tree, creating the radix tree according to a rule stored on a secondary storage of the storage server.

9. The method of claim 1, wherein the dataset comprises an exported file system.

10. The method of claim 1, wherein said request comprises a read access request, a write access request, a root access request, or any combination of the read, write, and root access requests.

11. The method of claim 1, wherein said radix tree is further used for determining whether a different request to access a different dataset maintained by the storage server should be allowed, if said dataset and said different dataset share a same access control rule which is represented by the radix tree.

12. A method comprising:
receiving, at a storage server, a request originated from a client to access a dataset maintained by the storage server;
identifying, by the storage server, a radix tree with a security mode of the client and an identification of the dataset;
using, by the storage server, an identifier of the client as a search key to search the radix tree stored in a cache memory for access permission information to determine whether the request should be allowed, the radix tree comprising a leaf node specifying access permission information associated with an IP address and a subnet node specifying access permission information shared by a plurality of IP addresses within a subnet, the subnet node specifying an exception operative to override the access permission information for an IP address within the subnet, and wherein the radix tree storing at least part of an access control rule associated with the dataset in one or more of the leaf node or the subnet nodes; and
if the access control rule is not found in the radix tree, queuing the request until the information is retrieved from a secondary storage.

13. The method of claim 12, wherein the dataset comprises an exported file system and the identifier comprises an Internet Protocol (IP) address.

14. A processing system comprising:
a processor;
a cache memory accessible by the processor; and
a memory coupled to the processor, the memory storing instructions which, when executed by the processor, cause the processing system to perform a process comprising:
searching a radix tree to find access permission information associated with an address, the radix tree comprising a leaf node specifying access permission information associated with an IP address and a subnet node specifying access permission information shared by a plurality of IP addresses within a subnet, the subnet node specifying an exception operative to override the access permission information for an IP address within the subnet, and wherein the radix tree is stored in the cache memory;
based on the access permission information, determining whether a request to access a dataset should be granted; and
if the access permission information is not found in the radix tree, queuing the request until the access permission information is retrieved from a secondary storage.

15. The processing system of claim 14, wherein the address is an Internet Protocol (IP) address, wherein the IP address is an address of a device which originated the request.

16. The processing system of claim 15, wherein the process further comprises:
if said searching does not find the access permission information associated with the IP address, accessing a rule stored in an external storage of the processing system to retrieve the access permission information; and
updating the radix tree to include the access permission information associated with the IP address.

17. A storage server comprising:
a cache memory comprising a structure storing a radix tree, the radix tree comprising a leaf node specifying access permission information associated with an IP address and a subnet node specifying access permission information shared by a plurality of IP addresses within a subnet, the subnet node specifying an exception operative to override the access permission information for an IP address within the subnet; and
an access control module to search the radix tree to determine whether a request received from a client to access the dataset should be granted and if the access permission information is not found in the radix tree, to store the request in a queue until the access permission information is retrieved from a secondary storage.

18. The storage server of claim 17 further comprises an export entry table, wherein the export entry table includes a plurality of entries, each entry containing a rule corresponding to one or more of a plurality of datasets.

19. A non-transitory machine-readable non-transitory storage medium storing sequences of instructions which, when executed by a processor of a processing system, cause the processing system to perform a process, the process comprising:
in response to a first request, causing a first thread to search a radix tree in a cache memory to find access permission information associated with an identifier, the radix tree comprising a leaf node specifying access permission information associated with an IP address and a subnet node specifying access permission information shared by a plurality of IP addresses within a subnet, the subnet node specifying an exception operative to override the access permission information for an IP address within the subnet;
causing a second thread to retrieve the access permission information from a secondary storage and to update the radix tree to include the access permission information, whenever the access permission information is not found in the radix tree;
inserting a data structure representing the first request into a queue before causing the first thread to start processing the second request; and
causing the first thread to start processing a second request, without blocking the first thread to wait for the second thread to finish said retrieving and updating.

20. The non-transitory machine-readable storage medium of claim 19, wherein the process further comprises causing the second thread or a third thread to process the first request after the second thread finishes said retrieving and updating.

* * * * *